United States Patent
Paice et al.

[11] 3,946,279
[45] Mar. 23, 1976

[54] ACTIVE IMPEDANCE MULTIPLIER

[75] Inventors: Derek A. Paice, Murrysville; Alan B. Shimp, Monroeville, both of Pa.

[73] Assignee: The United States of America as represented by the Secretary of the Interior, Washington, D.C.

[22] Filed: Dec. 10, 1974

[21] Appl. No.: 531,404

[52] U.S. Cl. ............... 317/18 C; 317/29 A; 323/76; 323/81; 333/80 T; 340/310 R
[51] Int. Cl.² .......................................... H02H 3/16
[58] Field of Search ................... 317/18 C, 29 A, 28; 340/310 R, 310 A; 333/80 T; 323/76, 79, 81

[56] References Cited
UNITED STATES PATENTS

| 2,248,784 | 7/1941 | Roseby | 340/310 R |
| 3,075,140 | 1/1963 | Casey et al. | 323/79 X |

FOREIGN PATENTS OR APPLICATIONS

| 1,224,381 | 3/1971 | United Kingdom | 317/18 C |

OTHER PUBLICATIONS
"Wave Filters Protect Carrier Signals From Shunting Effect of Capacitors", Electrical World, 11/19/1949, pp. 106–108—Ringger, Jr.

Primary Examiner—J. D. Miller
Assistant Examiner—Harry E. Moose, Jr.
Attorney, Agent, or Firm—Thomas Zack; Donald R. Fraser

[57] ABSTRACT

An active impedance multiplier circuit that can, as one of its uses, be used in a mine ground fault detection system. The purpose of the multiplier is to create a very high impedance for an AC signal that normally flows through a low impedance legitimate load. To accomplish this, the output of the multiplier is put in parallel with the low impedance load and impresses upon the load an appropriate voltage and current. When used in a fault detecting system, the impedance multiplier will act to normally prevent current from flowing in the low impedance load. AC current will flow to the legitimate load from the multiplier in response to signals obtained from an alternating current detector located within each multiplier. In its most basic form, the active impedance multiplier can be said to consist of a current detector and a current amplifier to amplify the detected current by a constant factor. The amplified output from the multiplier is in turn connected in parallel across the legitimate load.

12 Claims, 3 Drawing Figures

ACTIVE IMPEDANCE MULTIPLIER

BACKGROUND OF THE INVENTION

1. Field of the Invention

The invention described in this specification relates to an active impedance multiplier circuit.

2. Description of the Prior Art

It is presently known that the effective impedance of a legitimate load can be raised by means of a conventional filter. Such a filter may include a series inductor or a series inductor in conjunction with a parallel tuning capacitor. The disadvantage of this known technique is the large size and weight of the series inductor which has to be rated to carry the current of the legitimate load. In a typical application, such a filter inductor would weigh about 1,200 pounds, whereas an active impedance multiplier such as described in the invention only weighs about 60 pounds. Considering that the filter must in many cases be attached to a mobile load, the advantages of the light-weight impedance multiplier are clear.

SUMMARY

The active impedance multiplier circuit of this invention employs a current detector to detect the level of alternating current flowing in a legitimate load. The detected current is then fed to a current amplifying device whose output is connected in parallel across the low impedance legitimate load under observation.

The primary object of this invention is an improved impedance multiplier circuit.

BRIEF DESCRIPTION OF THE DRAWINGS

FIG. 1 schematically describes a typical mine system on which our invention can be used. In this system, an electrically powered direct current (DC) operated locomotive (legitimate load) receives power from an overhead trolley wire. Typically, the potential difference between the trolley wire and the rail is 300 to 600 volts. Supplying power to the trolley wires are a number of substations a mile or two apart. For purposes of simplicity, only two of the substations are illustrated. In addition to the DC voltage across the trolley wire, there is also superimposed an AC voltage of 3 kilohertz (kHz) and 12 volts. Current detectors at the substation respond only to the alternating current (not the DC) which flows into either the legitimate load or a fault (illegitimate load). If the legitimate load has a high impedance to 3 kHz AC, then any illegitimate load that may exist provides the only path for appreciable AC current flow. If AC current is detected, indicating the presence of a fault, discriminating circuit breakers (DISCB) at each substation are used to isolate the fault.

The system as described so far is generally old in the art. The novelty resides in using an active impedance multiplier to insure that the impedances of the legitimate loads powered by the DC voltage present a sufficiently high impedance to the AC signal such that little or no AC current flows through them. It has little or no effect upon the DC voltage or current. As mentioned in the discussion of the prior art, this same impedance raising function in the AC system was previously accomplished by using conventional filters like those that are inductor ballast types or resonant circuits in series with the legitimate loads. The drawback with using these types of filters is their sheer weight and cost. For example, suppose the legitimate load was a 10 horsepower machine, then each load could employ a conventional iron core inductor filter in series with it weighing about 69 pounds to raise its impedance to 200 or 300 ohms. Now the problem arises when the legitimate loads are 800 horsepower, as they are sometimes in a mine trolley system, since it is estimated that the filter weight required to raise the impedance would be between 1,200 to 1,400 pounds. It is important to note that if conventional filters were used, these filters would be of various sizes and would be associated with the various stationary and movable legitimate mine loads, such as lights, water pumps, and trolleys or locomotives. Because of their sizes and weight, using such filters in the congested environment of a mine would be undesirable. The purpose of our invention is to replace some of these filters with a simple circuit which accomplishes the same function with less weight, bulk, and expense. In essence, the term controlled active filter as well as active impedance multiplier could equally be applied to our invention to describe its operation.

Figure 1:
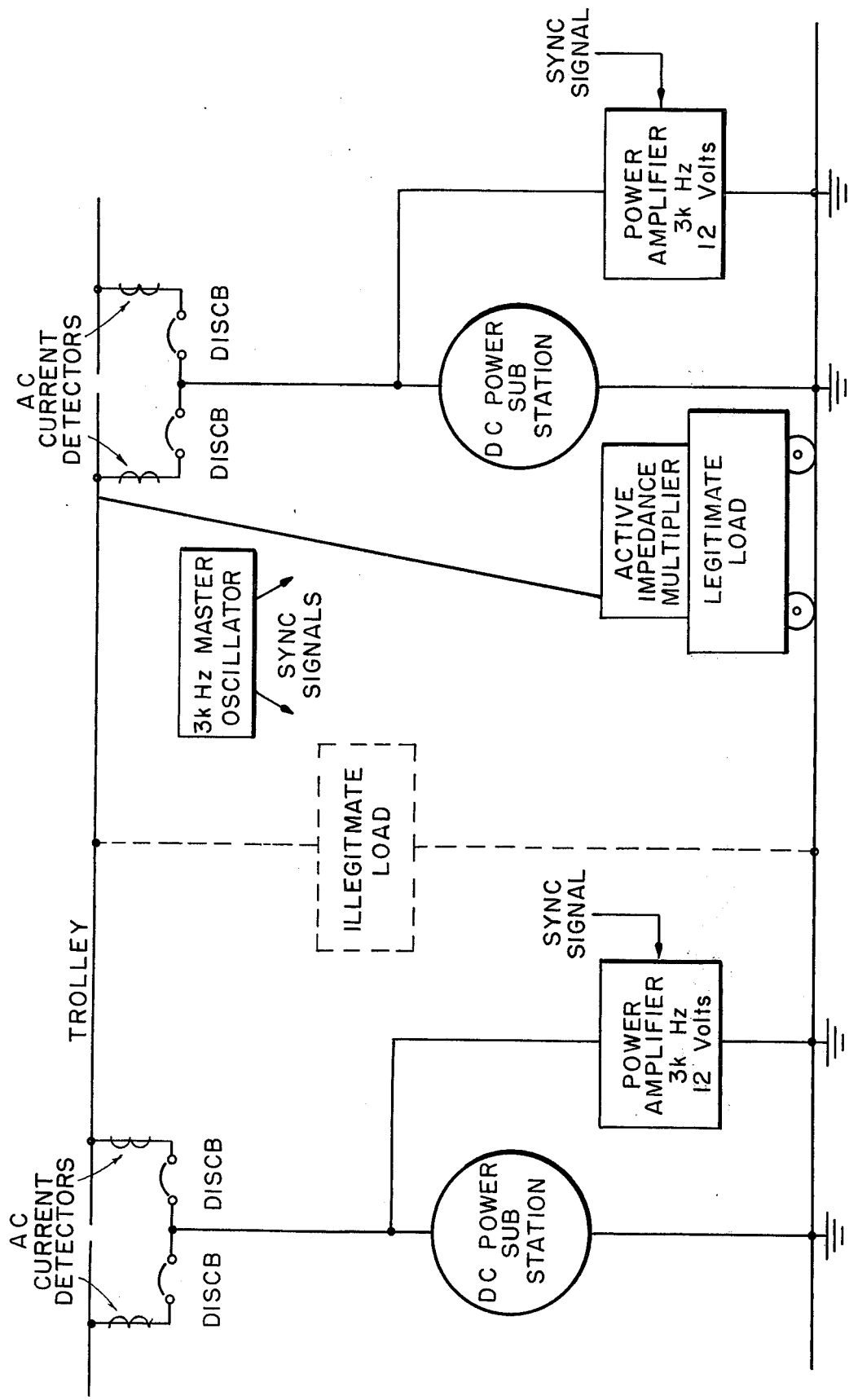
FIG. 1 is a schematic diagram of a mine ground fault detection system utilizing our invention.

One working embodiment of the FIG. 1 system using our invention employs a nominal 300 volt DC potential difference for the trolley wire of the legitimate load power line with about 200 to 2,000 amperes of DC current. The frequency of the AC signal is 3 kilohertz (kHz) in the system with about 12 volts (AC) drop across the trolley wire, and a quiescent AC current value of about 20 to 30 milliamperes (ma) in each multiplier. When an illegitimate load or fault occurs along the trolley wire, we measure the increase in AC current from its quiescent level with a current detector (like an air cored transformer) and if it exceeds a certain predetermined value (in the example 276 ma), a circuit breaker making up the DISCB system is activated to shut off all the power, both AC and DC.

Other features of the FIG. 1 system besides the two legitimate loads of up to 35 and 800 horsepower (trolley) include the 4 DISCBs and their four associated current detectors, the trolley's associated active impedance multiplier, the two DC power substations, the two power amplifiers of 3 kHz, and the 3 kHz master oscillator. The rail for the trolley acts as the grounded return for both the AC and DC systems. The master 3 kHz oscillator insures that the alternating voltage used to operate the power amplifiers is synchronized at 3 kHz. Usually, the AC voltage is similar for each multiplier and will be about 12 volts.

Figure 2:
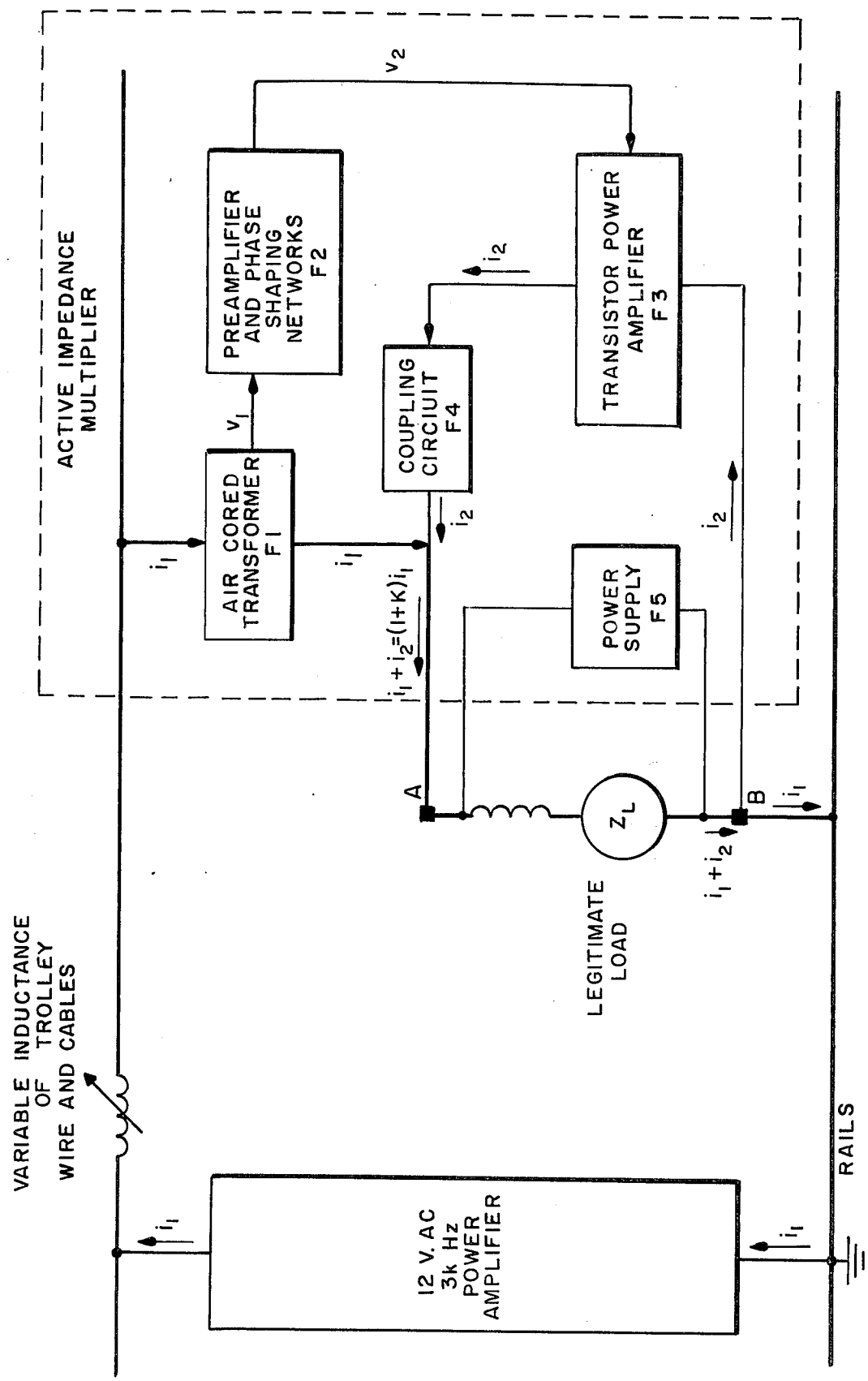
FIG. 2 schematically illustrates the block diagram for the major alternating current components at one substation of the FIG. 1 system.

FIG. 2 schematically illustrates in block diagram format the operation of the active impedance multiplier. As shown, there is an AC power source to impress a constant voltage of 12 volts at 3 kHz between the trolley wire and ground. The active impedance multiplier is physically attached to the legitimate load and moves with it. Within the impedance multiplier block enclosed by dashed rectangular lines—the operation has been broken down into five major functions designated by the letters F1 to F5 inclusive. This grouping shows F1 acting as a current detector (separate from that in the DISCBs) that uses an air cored transformer tuned to resonate at 3 kHz; F2 is the preamplifier and phase shaping network that receives signal V1 from detector circuit F1 and also sets (mainly by setting the amplifier gain of F2) a value for the multiplier constant K as well as controlling the phase shifts within the amplifier to stabilize the circuit; F3 is the transistor power amplifier circuit used to receive the output signal V2 from network F2 and amplify it; F4 represents the coupling network used to couple the F3 circuit to the output terminals A– B; and F5 is a DC power supply of 80 volts which is obtained from the 300 volts on the trolley wire.

Continuing with the explanation of FIG. 2, it is noted that the air cored transformer of detector F1 does not respond to DC signals but does respond to the 3 kHz AC current ($i_1$), which is flowing from the 12 volt power source of the legitimate load. Output signal V1 is proportional to this detected AC current. Voltage signal V1 is amplified by networks F2 and F3 and the current $i_2$ is outputted. This current $i_2$ from network F3 is directly proportional to current $i_1$. Mathematically, $i_2$ is equal to a constant K (K is usually a constant but may also be a complex number) times $i_1$ or $i_2 = K \times i_1$. The current $i_2$ is fed into the load by way of coupling circuit F4 so that the total AC current in the legitimate load is $i_1 + i_2$ or $(1 + K) \times i_1$. With the impedance multiplier in the circuit, the voltage across the legitimate load of impedance $Z_L$ is $(1 + K) i_1 \times Z_L$. If the apparent impedance of the load " seen" by the 3 kHz power source (FIG. 1 and FIG. 2) is Za, the Za is given by the voltage across the load divided by the current supplied from the power source or $$Za = \frac{(1+K) i_1 \times Z_L}{i} = (1+K) Z_L.$$

If the impedance multiplier is disconnected, the current in the legitimate load is $i_1$, the voltage across the load is $i_1 \times Z_L$, and the apparent impedance seen at the power source is $$Za = \frac{i_1 Z_L}{i_1} = Z_L.$$

From this comparison it is apparent that the impedance multiplier causes the legitimate load to appear to have a value of $(1 + K)$ times its actual impedance.

Figure 3:
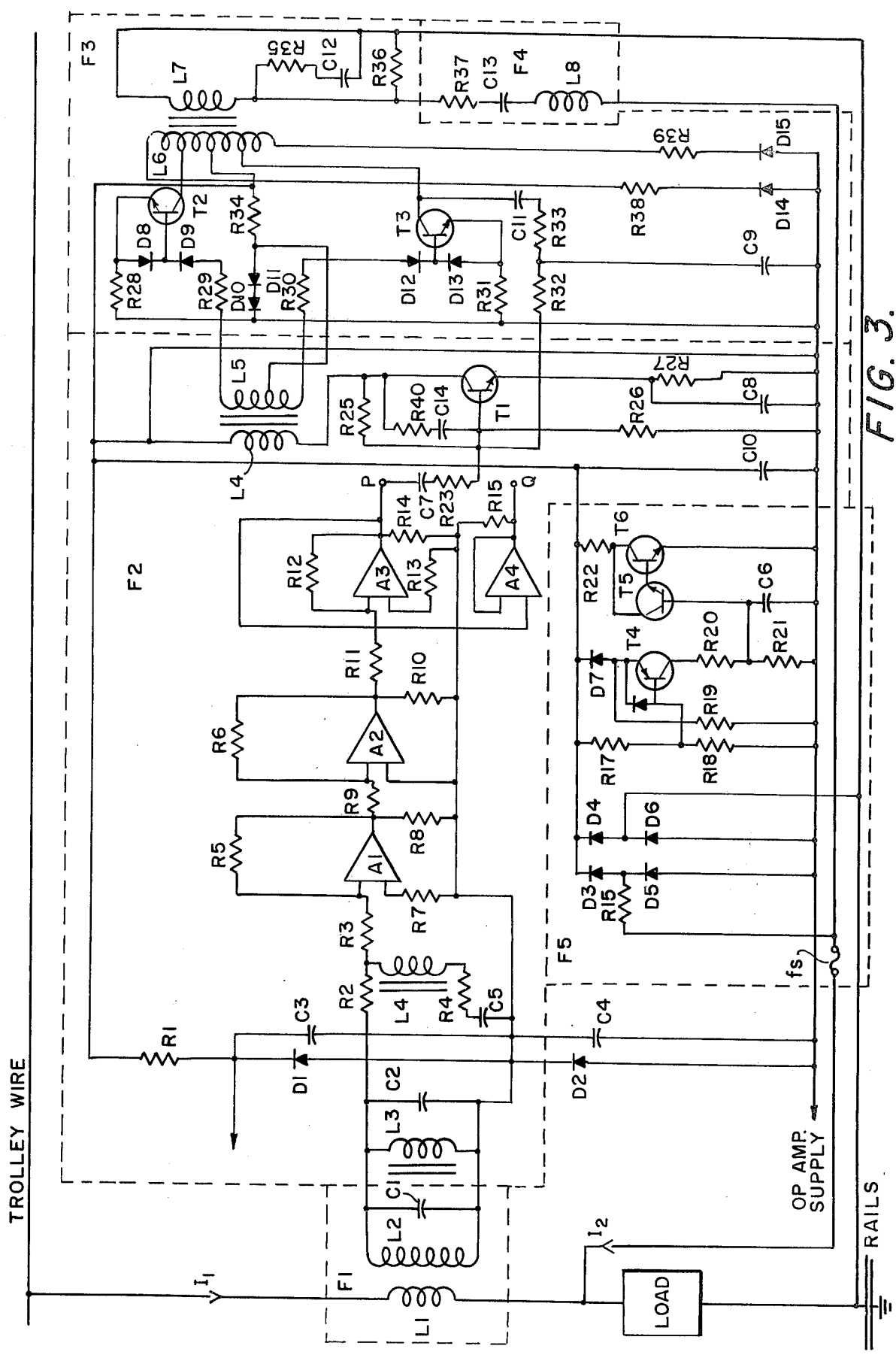
FIG. 3 is a circuit diagram of the impedance multiplier circuit illustrated in block format in FIG. 2.

FIG. 3 is a detailed circuit diagram of a preferred embodiment of the FIG. 2 block diagram. For ease in understanding its operation, elements of the actual circuit used that could be combined or simplified have been so combined. Dotted lines are around the respective circuit functions, previously mentioned, which were designated by the letters F1, F2, F3 F4, and F5 in FIG. 2. A toroidal wound single turn air cored transformer having magnetically reacting coils L1 and L2, makes up the multiplier's AC current detector designated by letter F1. Current $i_1$, composed of DC and AC segments, flows from the trolley wire to detector F1. When it arrives at coil L1 of the air cored transformer, the 3 kHz current is detected by a multiturn secondary winding (L2) which is a resonant circuit tuned to its 3 kHz frequency that disregards, as far as is possible, the DC current and other unwanted components. The frequency dependent AC current that is being detected is maintained constant to within plus or minus 0.1 percent by a tuning fork oscillator located in the power amplifier (see FIG. 2) supplying the 12 volts of constant AC voltage. Actually, it is not possible for the tuned resonant circuit of the detector to completely filter out extraneous signals such as the main power supply ripple frequency of 360 hertz. To filter out the 360 hertz ripple frequency transmitted through detector F1, the input side of the circuit components collectively designated as F2 have a trap filter circuit comprising the coil L4, the resistor R4, and the capacitor C5. This trap filter acts to short circuit signals of the 360 hertz frequency. The remainder of the F2 circuitry has three preamplifier stages ($A_1$, $A_2$, and $A_3$ or $A_4$) with a dual output (P and Q) in case it is desired to operate two impedance multipliers. Appropriate bias and feedback resistors (R5 to R15) are connected to the inputs and/or outputs of each of these solid state transistored operational amplifiers $A_1$, $A_2$, $A_3$, or $A_4$. Before entering the circuitry F3 for the power amplifier, the P output terminal (output Q is from the nonconnected and nonoperative transistor A4 arrangement) is connected via capacitor C7 and resistor R23 to a class A voltage amplifier made up of transistor amplifier T1 with its feedback DC bias set through resistor R27. This same transistor has its phase response controlled by a feedback connection through capacitor C14 and its series resistor R40.

After leaving the shaping network, the signal enters the power transistor amplifier circuit F3. The basic circuitry in the power amplifier is a class B power amplifier which is arranged to provide a constant current output as a function of the input power signal. Its purpose is to give the complete amplifier its amplified current. The power amplifier is comprised of power transistors $T_2$ and $T_3$ which are biased on by means of a network with resistor R34 and diodes D10 and D11. Emitter resistors R28 and R31 ensure that voltages applied from winding L5 cause a current forcing output to be generated in transformer L6. Internal feedback to control the current amplifier phase shift as applied by means of the network comprising capacitors C9 and C11, and resistors R32 and R33. To prevent transients from the trolley wire being applied to transistors $T_2$ and $T_3$, resistors R38 and R39 in conjunction with diodes D14 and D15 clamp the maximum voltage appearing at the secondary winding L6 of the output transformer. These diodes also prevent transistors $T_2$ and $T_3$ from saturating and having a very low voltage drop; this being desirable to prevent possible nonlinear oscillations of the power output amplifier. The output from the amplifier is impressed on a transformer having the two coils L6 and L7, resistors R35 and R36, and capacitor C12 to damp the natural resonance effects of the transformer. At this point current enters into the coupling network F4. As its name implies, the coupling network couples output from the circuitry of networks F1, F2, and F3 back into the DC system. It allows easy passage of the 3 kHz AC current from the system to the legitimate load, and at the same time, blocks the DC voltage (current) from the trolley wire from entering into the transformer having coils L6 and L7. The three components of the coupling network are the resistor R37, the capacitor C13, and the coil L8. In one working embodiment, the blocking capacitor C13 had a value of 2 microfarads, resistor R37 was 10 ohms, and coil L8 was 1.4 m Henries. The output from the coupling network is inputted to the legitimate load via the 600 volt, 5 ampere fuse fs.

The remainder of the circuitry shown in FIG. 3 is devoted to the regulated power supply F5. It is connected to the load via the fuse $f_S$; the grounded rails via a connection between diodes D4 and D6; to the operational amplifiers voltage supply via the grounded terminals of diodes D5 and D6 as well as resistors R18, R19, and R21 and capacitor C6 and the emitter leg of amplifier T6; and to the multiplier via the power side capacitor C10.

The stated purpose of the active impedance multiplier circuit is to make a low impedance legitimate load device having an impedance $Z_L$ appear to have an impedance of $(1 + K) Z_L$, where K is a constant of the multiplier. Typically, K is about 30 although numbers as high as 120 have been obtained. Ideally, when this is achieved, the AC current through the multiplier and legitimate load is kept near zero.

When considering a system such as the FIG. 1 system, other factors should be taken into consideration. For example, the location at which the fault occurs is important because the wire or cable of the trolley has its own impedance of about 35 ohms per mile at 3 kHz. In our actual working embodiment, the effect of this added variable impedance was considered and compensated for in obtaining an acceptable overall response.

One application of the invention is illustrated in FIG. 1 which shows a fault detecting system. Other applications of the impedance multiplier are possible. The only function of our invention is to create the effect of a very high impedance in a normally low impedance legitimate load. Once this impedance is increased, the particular circuit arrangement or the system will dictate the operational effect thereof. To illustrate another possible ramification of our invention other than its use in a fault detector system, say it was desired to transmit a voice communication signal over a long distance, like 12 to 15 miles, on a wire. Legitimate loads (DC) are presumed to be operated over the same line at the same time the signal for the voice communication is being transmitted. The problem is to prevent the voice signal from disappearing down the loads before it gets to the receiver end. What we propose to do is use basically the same impedance multiplier operated by an amplitude or frequency modulated signal of about 88 kHz. The multiplier in such a set up may multiply impedances to the legitimate loads as discussed in the fault detection system or it could effectively add to the loads depending on the internal current or voltage generator characteristics of the multiplier.

Other variations and uses for our invention are possible as will be apparent to those skilled in the art. None of the specifically disclosed features, uses, or circuit elements should limit the scope of our invention which is to be measured only by the claims that follow.

We claim:

1. An active impedance multiplier system comprising in combination:
    a low impedance load connected to an electric power source for the load;
    means for impressing a voltage with a substantially constant frequency across said low impedance load; and
    an active impedance multiplier circuit comprising a current detector with means for detecting the amount of the current from said means for impressing a voltage before it flows through said load; and current amplification means connected to the output of said current detector to amplify the level of its current by several factors and thereafter output this amplified current to the parallel connected low impedance load.

2. The circuit of claim 1 wherein said current detector comprises an air cored transformer and said means to amplify its output current comprises a phase shaping network and a transistorized power amplifier.

3. The circuit of claim 2 wherein said means to amplify the current additionally comprises a preamplifier stage with a filter connected to said transformer at its input and said phase shaping network at its output.

4. The circuit of claim 3 also including a power supply operatively connected to said means to amplify the detected current and a coupling network to connect the output from the current amplifier to the load.

5. The circuit of claim 1 including means within said multiplier circuit near its output and input to block undesired signals from the power source for the load and thereby electrically isolate the multiplier such that only the voltage at a constant frequency is received.

6. The circuit of claim 1 wherein said means for impressing a voltage with a substantially constant frequency comprises means for maintaining said voltage level substantially constant.

7. A mine ground fault detection system comprising in combination:
    a power line to carry power to a legitimate load by the application of direct current thereto, said line having a grounded return line;
    a first current detector and circuit breaker connected to the circuit in said line;
    an active impedance multiplier operated by an alternating voltage source along the same line as the power line for the legitimate load, said multiplier having its output connected in parallel across the laod;
    means for disconnecting the power to the primary power line when said first detector causes its circuit breaker to be actuated by a fault in the line; and
    a second current detector and current amplification means in said multiplier to detect the alternating current flowing in the primary power line and multiply its value by a constant value before it flows through said legitimate load.

8. The system of claim 7 wherein there is a plurality of loads and multipliers and the number of loads powered by direct current is equal to the number of impedance multipliers, there being one multiplier associate with one load.

9. The system of claim 8 wherein there is an alternating voltage source for each multiplier that is operated at the same frequency and synchronized with the frequencies of the voltage sources operating the other multipliers.

10. The system of claim 8 wherein each of said impedance multipliers comprise an air cored transformer for its current detector and a transistorized power amplifier for its current amplification means.

11. The system of claim 8 wherein at least one of said legitimate loads is a movable electrically powered trolley that rides on rails constituting said grounded return rails;
    at least one of said impedance multipliers being affixed to said trolley and movable therewith;
    and said alternating voltage source being operated at less than 100 volts and at a frequency of over 1,000 hertz.

12. The system of claim 8 wherein at least one of said loads is an electrically operated trolley powered to move on grounded rails;
at least one impedance multiplier is operatively associated with said trolley as it moves; and
the second current detector of said associated multipliers comprises an air cored transformer and its current amplifier means comprises a transistorized power amplifier.

\* \* \* \* \*